(12) United States Patent
Shaw (10) Patent No.: US 7,874,381 B2
(45) Date of Patent: Jan. 25, 2011

(54) PNEUMATIC LINE DEICING SYSTEM (75) Inventor: Stephen Glenn Shaw, Longview, TX (US)

(73) Assignee: Skyhawk Chemicals, Inc., Houston, TX (US)

( * ) Notice: Subject to any disclaimer, the term of this patent is extended or adjusted under 35 U.S.C. 154(b) by 120 days.

(21) Appl. No.: 12/201,006

(22) Filed: Aug. 29, 2008

(65) Prior Publication Data
US 2010/0051281 A1    Mar. 4, 2010

(51) Int. Cl.
*E21B 7/00* (2006.01)
*E21B 21/14* (2006.01)
*E21B 47/00* (2006.01)

(52) U.S. Cl. .................. 175/57; 175/69; 166/250.01

(58) Field of Classification Search .................. None
See application file for complete search history.

(56) References Cited

U.S. PATENT DOCUMENTS

2006/0277942 A1 *  12/2006  Clodic et al. .................. 62/532

* cited by examiner

*Primary Examiner*—Zakiya W. Bates
(74) *Attorney, Agent, or Firm*—Conley Rose, P.C.; Grant Rodolph; Elexis A. Jones (57) ABSTRACT

A wellbore servicing method comprising supplying a deicing fluid to a pressurized pneumatic line on a drilling rig, whereby the deicing fluid retards the formation of ice within the pressurized pneumatic line. A wellbore servicing apparatus comprising a pump, a sight glass container coupled to the pump, and a storage tank coupled to the sight glass container and the pump. A wellbore servicing apparatus comprising an air regulator configured to couple to a pneumatic line coupled to an air compressor, a pneumatic pump coupled to the air regulator and configured to couple to the pneumatic line, a sight glass container coupled to the pneumatic pump, and a storage tank coupled to the sight glass container and the pneumatic pump.

10 Claims, 6 Drawing Sheets

PNEUMATIC LINE DEICING SYSTEM

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Natural resources such as gas, oil, and water residing in a subterranean formation or zone are usually recovered by drilling a wellbore down to the subterranean formation while circulating a drilling fluid in the wellbore. After terminating the circulation of the drilling fluid, the well may be completed by running a string of pipe, e.g. casing, into the wellbore. The drilling fluid is then usually circulated downward through the interior of the pipe and upward through the annulus, which is located between the exterior of the pipe and the walls of the wellbore. In addition, a cement slurry may be placed in the annulus and permitted to set into a hard mass (i.e., sheath) to thereby attach the string of pipe to the walls of the wellbore and seal the annulus.

These drilling and completion activities are typically implemented using a variety of specialized tools. Some of these tools may be pneumatically powered, and thus the drilling rig may contain one or more air compressors to generate the required pressure and volume of compressed air. Because these air compressors draw air directly from the atmosphere, any moisture in the air is conveyed into the pressured pneumatic lines and the pneumatic tools. When the temperature drops below freezing, for example at night or during winter months, the moisture may freeze and restrict or completely block the flow of air to the pneumatic tools. Such restrictions or blockages prevent the drilling rig from being fully operational.

SUMMARY

In one embodiment, the disclosure includes a wellbore servicing method comprising supplying a deicing fluid to a pressurized pneumatic line on a wellbore servicing equipment, whereby the deicing fluid retards the formation of ice within the pressurized pneumatic line.

In another embodiment, the disclosure includes a wellbore servicing method comprising transporting a pneumatic line deicing system to a wellbore servicing site, connecting the pneumatic line deicing system to a pneumatic line, monitoring operations on the wellbore servicing site, detecting a non-optimal situation at the wellbore servicing site, injecting a deicing fluid by the pneumatic line deicing system into the pneumatic line, and monitoring the wellbore servicing site to ensure that the injection of the deicing fluid corrected the non-optimal situation at the wellbore servicing site In another embodiment, the disclosure includes an apparatus comprising a pump, a sight glass container coupled to the pump, and a storage tank coupled to the sight glass container and the pump.

In yet another embodiment, the disclosure includes a wellbore servicing apparatus comprising an air regulator configured to couple to a pneumatic line coupled to an air compressor, a pneumatic pump coupled to the air regulator and configured to couple to the pneumatic line, a sight glass container coupled to the pneumatic pump, and a storage tank coupled to the sight glass container and the pneumatic pump.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are an apparatus and method for deicing a pneumatic line in a wellbore servicing system. Specifically, a pneumatic line deicing system is disclosed that injects a deicing fluid into the pneumatic line used to power the drilling and production tools on a drilling rig. The pneumatic line deicing system is configured to use the compressed air to power a pneumatic pump that injects a deicing fluid into the pneumatic line, thereby retarding ice formation in the pneumatic line and the tools. The pneumatic line deicing system may be particularly well suited for remote drilling rig operations at least in part because it can rely exclusively on pneumatic power and does not require any electrical power to run its pumps or metering equipment.

Figure 1:
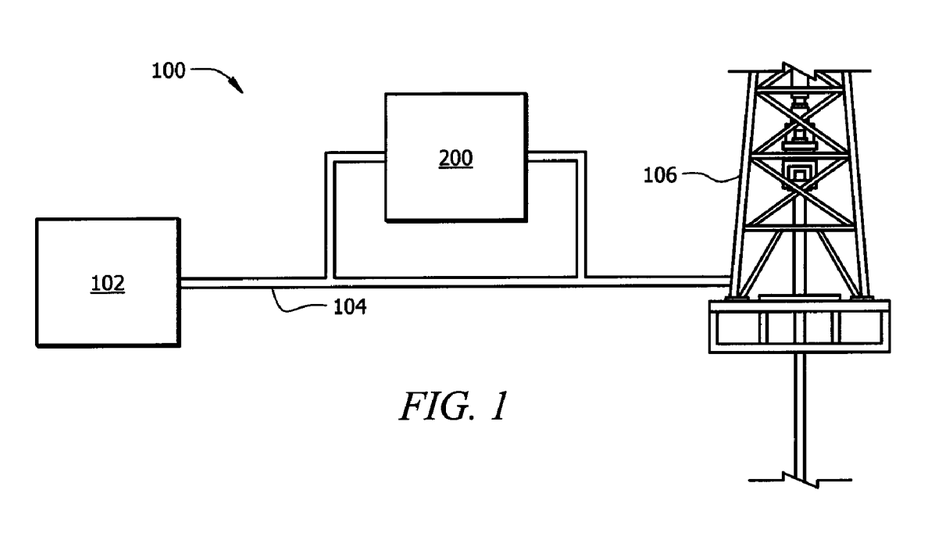
FIG. 1 is a schematic diagram of one embodiment of a wellbore servicing system.

FIG. 1 illustrates an embodiment of a wellbore servicing system 100. The wellbore servicing system 100 may comprise any apparatus that promotes the creation of a subterranean wellbore, the placement of material into the wellbore, or the removal of material from the wellbore. For example, the wellbore servicing system 100 may be a plurality of drilling equipment configured to drill a hydrocarbon production wellbore. The wellbore servicing system 100 may comprise an air compressor 102, a pneumatic line 104, a rig 106, and a pneumatic line deicing system 200. Each of these components is described in detail below.

The air compressor 102 may comprise any device that conveys air to a wellbore servicing apparatus, such as the rig 106. Specifically, the air compressor 102 may receive a feed of atmospheric air, compress the air, and convey the compressed air into the pneumatic line 104. The air compressor 102 may employ a filter and/or dryer at the inlet side to clean and/or dry in the inlet air prior to compression. However, even with a filter and/or dryer in place, the air compressor 102 may still pass some of the atmospheric moisture to the pneumatic line 104. Such moisture may be in a liquid or vapor state. The air compressor 102 may be a dynamic air compressor, such as a centrifugal or axial air compressor. Alternatively, the air compressor 102 may be a positive displacement air compressor, such as a reciprocating or rotary air compressor. In a specific embodiment, the air compressor 102 is a screw type air compressor. In embodiments, the air exiting the air compressor 102 has a pressure of at least about 100 pounds per square inch (psi), at least about 150 psi, or at least about 200 psi.

The pneumatic line 104 may comprise any conduit that conveys compressed air from the air compressor 102 to the rig 106. While the pneumatic line 104 may be a single line from the air compressor 102 to the rig 106, more typically the pneumatic line 104 will be a plurality of lines arranged in a branching configuration. The pneumatic line 104 is typically a small, e.g. less than one inch, diameter metal, plastic, or rubber tubing containing a plurality of valves, tees, elbows, and other types of fittings. Absent any blockages such as ice or other problems, the pressure within the pneumatic line 104 is typically substantially the same from the air compressor 102 to the rig 106.

The rig 106 may comprise any wellbore servicing apparatus that uses compressed air to directly or indirectly service a wellbore. For example, the rig 106 may use the compressed air to power one or more pneumatic tools, such as the wrenches, drivers, and brakes used to couple, rotate, uncouple, and otherwise manipulate drill pipe, casing, and/or tubing. Alternatively, the compressed air may be used to convey liquids or solids, such as proppant, into the wellbore.

The pneumatic line deicing system 200 may comprise any apparatus that retards, mitigates, or prevents the formation of ice within the pneumatic line 104. Specifically, the pneumatic line deicing system 200 may inject a sufficient amount of deicing fluid into the pneumatic line 104 to retard, mitigate, abate, or prevent the formation of ice within the pneumatic line 104. The deicing fluid may comprise any substance that decreases the freezing point of the moisture in the pneumatic line 104. For example, the deicing fluid may be an alcohol such as methanol, ethanol, ethylene glycol, or combinations thereof. The deicing fluid may be in a liquid-phase or a vapor-phase. In an embodiment, the pneumatic line deicing system 200 may be pneumatically powered such that it does not require electrical, mechanical, hydraulic, or any other type of power. In such a case, the pneumatic line deicing system 200 may be placed in a parallel manner to the pneumatic line 104, as is illustrated in FIG. 1. In embodiments, the pneumatic line deicing system 200 may be located on the pneumatic line 104 about adjacent to, from about one foot to about 100 feet, from about three feet to about 50 feet, or from about five feet to about 20 feet downstream from the air compressor 102. There may be heating elements on the pneumatic line 104 from the air compressor 102 to the pneumatic line deicing system 200 to prevent freezing of that stretch of the pneumatic line 104 so that the compressed air can reach the pneumatic line deicing system 200.

In an embodiment, the pneumatic line deicing system 200 may inject the deicing fluid into the pneumatic line 104 while the compressed air from the air compressor 102 powers the pneumatic tools on the rig 106. Specifically, the pneumatic line deicing system 200 may inject deicing fluid into the pneumatic line 104 while the rig 106 operates, thereby mitigating, or preventing any downtime. Once the deicing fluid reaches the pneumatic tools on the rig 106, the deicing fluid may be vented into the atmosphere, e.g., through a vent in the tools.

FIGS. 2-6 illustrate an embodiment of the pneumatic line deicing system 200. The pneumatic line deicing system 200 may comprise an air inlet 202, an inlet air shut-off valve 204, an air regulator 206, a pump discharge control 208, a pneumatic pump 210, and a vent 212. Additionally, the pneumatic line deicing system may comprise a storage tank 214, a lid 216, a sight glass container 218, a sight glass valve 220, and a deicing fluid shut-off 222. Furthermore, the pneumatic line deicing system 200 may also comprise a check valve 224, a deicing fluid outlet 226, a frame 228, a first flag 230, and a second flag 232. The relationship of these components is shown conceptually in FIG. 2 and structurally in FIGS. 3-6. Each of these components is described in detail below.

The air inlet 202 may comprise any opening that is configured to receive a fluid. Specifically, the air inlet 202 may receive compressed air from the pneumatic line 104, and thus may be configured to couple to the pneumatic line 104 via a threaded, flanged, or other type of connection. In embodiments, the air inlet 202 receives high-pressure compressed air, such as at least about 100 psi, at least about 150 psi, or at least about 200 psi.

The inlet air shut-off valve 204 may comprise any device that is configured to regulate fluid flow. For example, the inlet air shut-off valve 204 may be a gate valve, a globe valve, an angle valve, a diaphragm valve, a plug cock, a ball valve, or a butterfly valve. The inlet air shut-off valve 204 may be coupled to the air inlet 202. Alternatively, the inlet air shut-off valve 204 may be configured to directly couple to the pneumatic line 104 and may receive compressed air from the air compressor 102 via the pneumatic line 104. In an embodiment, the inlet air shut-off valve 204 may act as a shut-off of the pneumatic line deicing system 200 by preventing compressed air flow beyond the inlet air shut-off valve 204, e.g. to the pneumatic pump 210. For example, once the pneumatic line deicing system 200 is no longer needed, such as during the day or summer months when the temperature is not cold enough for ice to form in the pneumatic line 104, the inlet air shut-off valve 204 can be turned to the off position. Turning the inlet air shut-off valve 204 to the off position may prevent compressed air from progressing beyond the inlet air shut-off valve 204. In such a case, the pneumatic line deicing system 200 will be non-operational such that the pneumatic line deicing system 200 will not inject any deicing fluid into the pneumatic line 104. Additionally, turning the inlet air shut-off valve 204 to the off position may preserve the settings of the pneumatic line deicing system 200 as specified by the user, such as the setting of the pump discharge control 208, and thus may prevent the user from having to reset the pneumatic line deicing system 200 the next time the pneumatic line deicing system 200 needs to be used.

Air exiting the inlet air shut-off valve 204 may flow to the air regulator 206. The air regulator 206 may be any device that reduces the pressure of air to a usable pressure. Specifically, the air regulator 206 may be any apparatus that reduces the pressure of the compressed air that entered the pneumatic line deicing system 200 through the air inlet 202. In embodiments, the air regulator 206 decreases the air pressure to an intermediate pressure of about 10 psi to about 130 psi, about 30 psi to about 110 psi, or about 40 psi to about 90 psi.

The compressed air may exit the air regulator 206 and flow to the pneumatic pump 210 perhaps via the pump discharge control 208. The pneumatic pump 210 may be any device that uses pressurized air to move fluids. For example, the pneumatic pump 210 may use pressurized air to inject the deicing fluid into the pneumatic line 104. In an embodiment, the pneumatic pump 210 is a WellMark positive displacement pump, model number CIP 150-25-16S. In alternative embodiments, the pneumatic pump 210 may be another type of pump including such as a hydraulic pump or an electric pump. As explained below, the pneumatic pump 210 may comprise the vent 212 and may be controlled by the pump discharge control 208.

The pneumatic pump 210 may comprise a drive port 234, an ingress port 236, and an egress port 238. The drive port 234 of the pneumatic pump 210 may be coupled to the air regulator 206 perhaps via the pump discharge control 208. In an embodiment, the compressed air with an intermediate pressure from the air regulator 206 flows through the pump discharge control 208 and enters the drive port 234 of the pneumatic pump 210. The pneumatic pump 210 may comprise a typical piston/plunger assembly. In an embodiment, the pneumatic pump 210 comprises a spring biasing the piston/plunger assembly upward. The compressed air with an intermediate pressure from the air regulator 206 may enter the drive port 234 of the pneumatic pump 210 and drive the piston/plunger assembly downward thereby injecting the deicing fluid out the egress port 238 of the pneumatic pump 210 into the pneumatic line 104.

The pneumatic pump 210 may comprise a pump discharge control 208. The pump discharge control 208 may control the pump stroke of the pneumatic pump 210. For example, the pump discharge control 208 may allow compressed air with an intermediate pressure to enter the drive port 234 of the pneumatic pump 210 and drive the piston/plunger assembly downward. In an embodiment, the pump discharge control 208 includes a dial indicating increments. For example, the pump discharge control 208 may include a dial with increments of zero to 100. The increments on the dial (e.g. 0-100) of the pump discharge control 208 may refer to how many pump cycles the pneumatic pump 210 strokes during a period of time. More specifically, the increments on the dial of the pump discharge control 208 may refer to how many times the pneumatic pump 210 injects the deicing fluid into the pneumatic line 104 during a period of time. In an embodiment, the increments on the dial of the pump discharge control 208 refer to how many times the pneumatic pump 210 injects the deicing fluid into the pneumatic line 104 during a 24-hour period. For example, if the dial of the pump discharge control 208 is set to increment 48, the pump discharge control 208 will allow the compressed air with an intermediate pressure to enter the drive port 234 of the pneumatic pump 210 48 different times (e.g., at about equally spaced time intervals) and drive the piston/pump assembly downward such that the pneumatic pump 210 will inject deicing fluid into the pneumatic line 104 48 different times during a 24-hour period. Thus, every 30 minutes the compressed air will drive the piston/plunger assembly of the pneumatic pump 210 downward causing the pneumatic pump 210 to inject one stroke volume of the deicing fluid into the pneumatic line 104.

The speed of the pump stroke of the pneumatic pump 210 may vary depending on the type of pneumatic pump. Thus, continuing with the same example from the paragraph above, if the dial of the pump discharge control 208 is set to increment 48, the pneumatic pump 210 may pump one one-second stroke every 30 minutes for 24 hours, one five-minute stroke every 30 minutes for 24 hours, one 30-minute stroke every 30 minutes for 24 hours, or any other length of pump stroke less than 30 minutes every 30 minutes for 24 hours. The ability to control how many times the pneumatic pump 210 injects deicing fluid during a 24-hour period enables users to customize the setting of the pump discharge control 208 to meet their own needs and to control the rate of addition of deicing fluid to the pneumatic line 104.

The vent 212 may comprise any device that allows unwanted fluids to escape into the atmosphere. Specifically, the vent 212 may vent the compressed air used by the pneumatic pump 210 into the atmosphere. In an embodiment, the vent 212 vents low pressure air used by the pneumatic pump 210 into the atmosphere.

The ingress port 236 of the pneumatic pump 210 may receive deicing fluid from the storage tank 214 perhaps via the sight glass container 218. The storage tank 214 may be any device that may be used to store fluids, such as the deicing fluid. In an embodiment, the size of the storage tank 214 varies depending on the needs of the user. For example, in a location where ice forms in the pneumatic line 104 frequently, a larger storage tank 214 may be used, such as a 65-gallon storage tank. Whereas in a place where ice rarely forms in the pneumatic line 104, a smaller storage tank 214 may be used, such as a five-gallon storage tank. The storage tank 214 may include divisions that allow for a reading of the deicing fluid level in the storage tank 214. In an embodiment, the storage tank 214 comprises a lid 216. The lid 216 may be removed from the storage tank 214 at any time in order to add deicing fluid. In other words, the pneumatic line deicing system 200 does not need to be turned off in order to add more deicing fluid to the storage tank 214. Thus, the pneumatic line deicing system 200 can continue to mitigate or prevent the formation of ice within the pressurized pneumatic line 104 while more deicing fluid is added to the storage tank 214.

Alternatively or additionally, the ingress port 236 of the pneumatic pump 210 may receive deicing fluid from the sight glass container 218 that may be coupled to the storage tank 214. The sight glass container 218 may be any device comprising a translucent material that stores fluid. Specifically, the sight glass container 218 may comprise a translucent material such as glass and store some of the deicing fluid. Additionally, the sight glass container 218 may have a plurality of divisions to allow for a fluid level reading. In an embodiment, the divisions on the sight glass container 218 enable users to have an accurate reading of the amount of deicing fluid in the sight glass container 218 as well as an accurate reading of the amount of deicing fluid in the storage tank 214. For example, each division on the sight glass container 218 may represent one ounce of fluid in the sight glass container 218 and one quart or gallon of fluid in the storage tank 214. In such a case, if the deicing fluid were up to the third division in the sight glass container 218, a user would know that there were three ounces of deicing fluid in the sight glass container 218 and three quarts or gallons of deicing fluid in the storage tank 214.

In an embodiment, the sight glass container 218 may comprise the first flag 230 and the second flag 232. The first flag 230 and the second flag 232 may serve a variety of uses. For example, the first flag 230 may represent a full marker indicating that no additional deicing fluid needs to be added to the storage tank 214, while the second flag 232 may represent a refill marker indicating that additional deicing fluid needs to be added to the storage tank 214. The first flag 230 and the second flag 232 may vary in position on the sight glass container 218 depending on the needs of the user. In addition, the color of the first flag 230 and the second flag 232 may vary depending on the preference of the user. In embodiments, there are more flags than just the first flag 230 and the second flag 232. In such a case, other flags could indicate, for example, that the storage tank 214 is a quarter empty, the storage tank 214 is halfway empty, the storage tank 214 is three-quarters empty, or the storage tank 214 is critically low.

The sight glass container 218 may comprise a sight glass valve 220. The sight glass valve 220 may be any device that regulates fluid flow. Specifically, the sight glass valve 220 may control the deicing fluid flow from the storage tank 214 to the sight glass container 218. For example, when the sight glass valve 220 is in a first position, the deicing fluid flows from the storage tank 214 to the sight glass container 218 to the ingress port 236 of the pneumatic pump 210. In an embodiment, the first position of the sight glass valve 220 is when the sight glass valve 220 is pulled out. On the other hand, when the sight glass valve 220 is in a second position, no deicing fluid flows from the storage tank 214 to the sight glass container 218. Rather, only the deicing fluid already in the sight glass container 218 flows to the ingress port 236 of the pneumatic pump 210. In an embodiment, the second position of the sight glass valve 220 is when the sight glass valve 220 is pushed in.

The ability to have the pneumatic pump 210 only pull deicing fluid from the sight glass container 218 enables the user to determine how much deicing fluid is being injected into the pneumatic line 104 and perhaps to calibrate the amount of deicing fluid injected into the pneumatic line. For example, assume that the sight glass valve 220 is in the second position and the sight glass container 218 contains three ounces of deicing fluid, which means that the deicing fluid is up to the third division of the sight glass container 218 if each division represents one ounce of fluid in the sight glass container 218. If the pneumatic pump 201 operates for an hour and only one ounce of deicing fluid remains in the sight glass container 218, the user can conclude that the pneumatic pump 210 is injecting two ounces of deicing fluid per hour at the current setting.

Additionally, the ability to have the pneumatic pump 210 only pull deicing fluid from the sight glass container 218 allows the user to measure the stroke volume of the pneumatic pump 210. For example, assume that the sight glass valve 220 is in the second position and the sight glass container 218 contains 10 ounces of deicing fluid, which means that the deicing fluid is up to the tenth division of the sight glass container 218 if each division represents one ounce of fluid in the sight glass container 218. If the pump strokes one time and the deicing fluid level subsequently falls to the ninth division of the sight glass container 218, the user can conclude that the pneumatic pump 210 stroke volume is one ounce. In other words, the user could conclude that the pneumatic pump 210 is moving one ounce of deicing fluid per stroke. For smaller stroke volumes, the user can have the pneumatic pump 210 stroke a plurality of times and divide the reduced deicing fluid volume by the number of strokes to obtain the volume per stroke.

Furthermore, the ability to have the pneumatic pump 210 only pull deicing fluid from the sight glass container 218 enables users to do a quick diagnostic check on the pneumatic deicing system 200 to verify that the deicing fluid is in fact being injected into the pneumatic line 104. Often times, it is difficult to tell if the pneumatic deicing system 200 is actually injecting deicing fluid into the pneumatic line 104 by looking at the storage tank 214 because the storage tank 214 holds a large amount of deicing fluid, which makes it difficult to see the level of deicing fluid drop. However, because the sight glass container 218 holds a smaller amount of deicing fluid than the storage tank 214, it is easier for the user to see the level of deicing fluid change and thus verify whether the pneumatic deicing system 200 is injecting deicing fluid into the pneumatic line 104. The deicing fluid from the storage tank 214 and the sight glass container 218 if the sight glass valve 220 is in the first position or from just the sight glass container 218 if the sight glass valve 220 is in the second position may flow to the ingress port 236 of the pneumatic pump 210 through the deicing fluid shut-off valve 222.

The deicing fluid shut-off valve 222 may comprise any device that is configured to regulate fluid flow. Specifically, the deicing fluid shut-off valve 222 may be any of the valves described in conjunction with the inlet air shut-off valve 204 above. In an embodiment, the deicing fluid shut-off valve 222 may act as an emergency shut-off of the pneumatic line deicing system 200 by preventing deicing fluid flow beyond the deicing fluid shut-off valve 222. For example, the deicing fluid shut-off valve 222 may be turned to the off position to prevent deicing fluid from progressing beyond the deicing fluid shut-off valve 222 and entering the ingress port 236 of the pneumatic pump 210. In such a case, the pneumatic line deicing system 200 will be non-operational such that the pneumatic line deicing system 200 will not inject any deicing fluid into the pneumatic line 104.

Returning to the pneumatic pump 210, the egress port 238 of the pneumatic pump 210 may be coupled to the check valve 224. The check valve 224 may be any device that prohibits fluid flow in one direction. Specifically, the check valve 224 may prevent compressed air from entering the egress port 238 of the pneumatic pump 210. The check valve 224 may be coupled to the deicing fluid outlet 226. Alternatively, the check valve 224 may be configured to directly couple to the pneumatic line 104. In embodiments, the egress port 238 of the pneumatic pump 210 injects the deicing fluid through the check valve 224 out the deicing fluid outlet 226 into the pneumatic line 104 at a pressure of at least about 500 psi, at least about 1,500 psi, or at least about 3,000 psi.

The deicing fluid outlet 226 may comprise any opening that is configured to output fluid. Specifically, the deicing fluid outlet 226 may output the deicing fluid received from the egress port 238 of the pneumatic pump 210. In an embodiment, the deicing fluid outlet 226 is configured to couple to the pneumatic line 104 via a threaded, flanged, or other type of connection. In an embodiment, the deicing fluid outlet 226 outputs the deicing fluid received from the egress port 238 of the pneumatic pump 210 and the check valve 224 to the pneumatic line 104.

The frame 228 may comprise any device that provides support to the pneumatic line deicing system 200. Specifically, the frame 228 may be a structured steel framework that supports the pneumatic line deicing system 200 and elevates the pneumatic line deicing system 200 off the ground. In an embodiment, the frame 228 is coupled to the air regulator 206, the pneumatic pump 210, the storage container 214, and the sight glass container 218.

Figure 2:
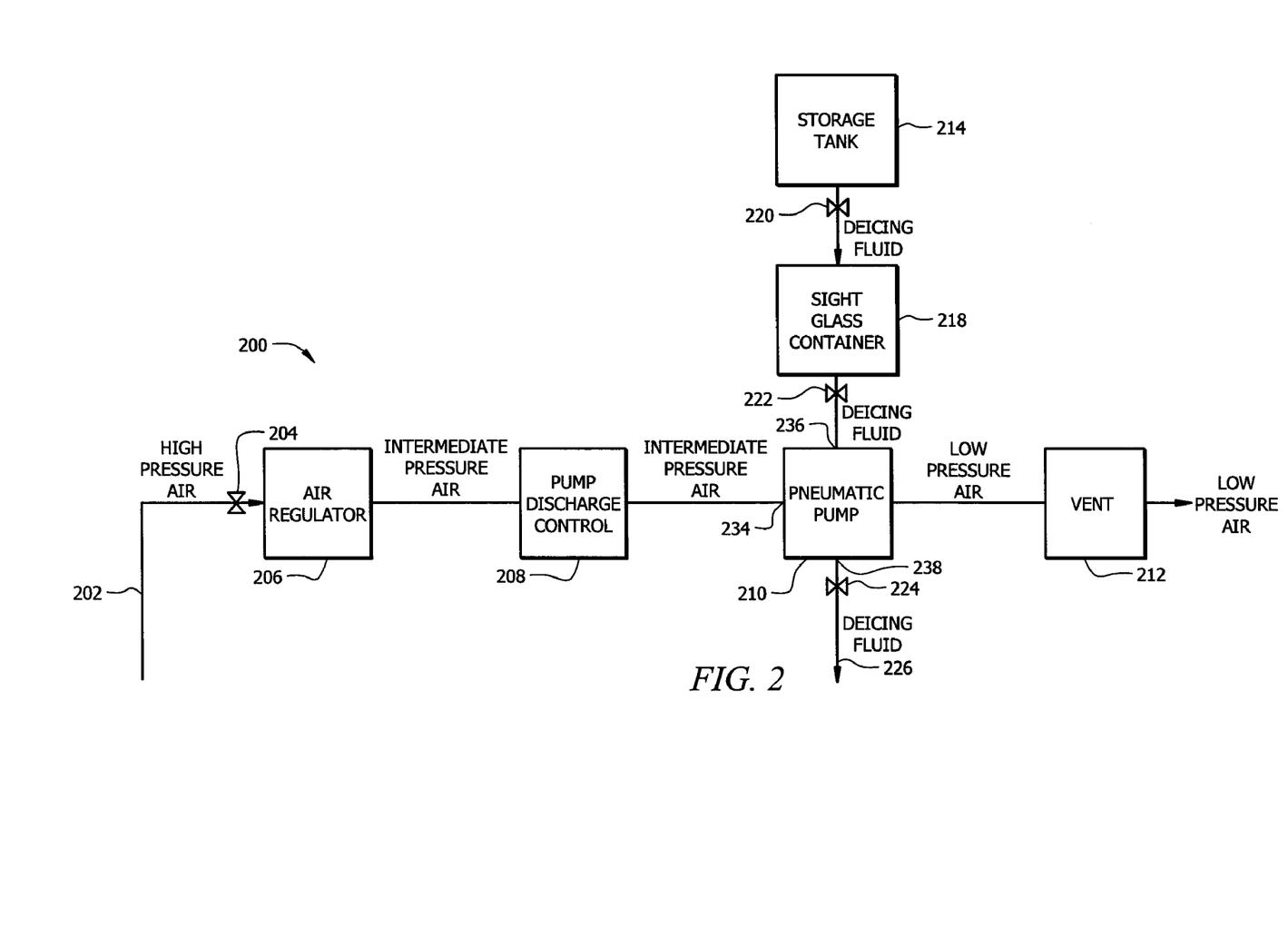
FIG. 2 is a schematic diagram of one embodiment of a pneumatic line deicing system.
Figure 3:
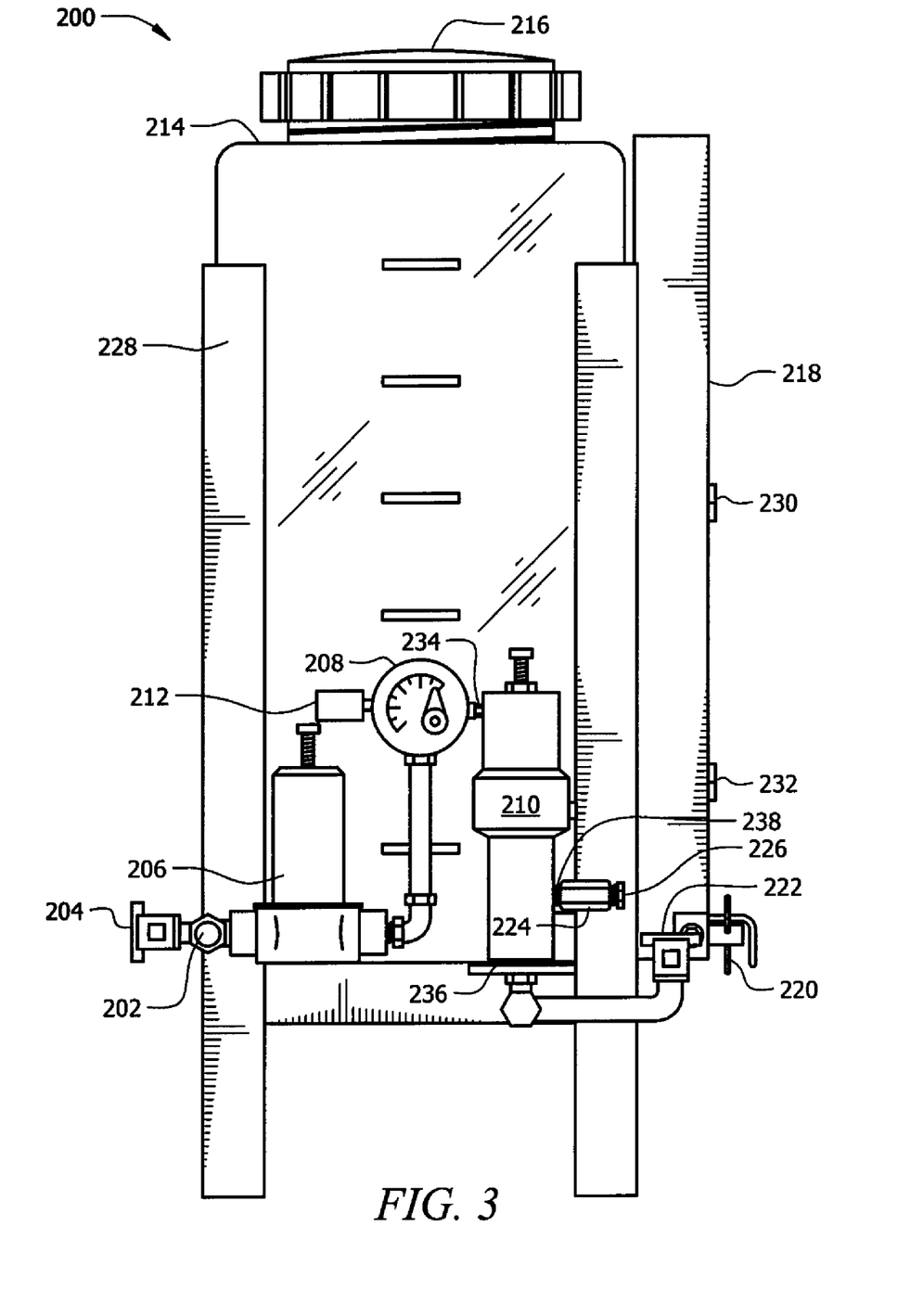
FIG. 3 is a front view of one embodiment of a pneumatic line deicing system.
Figure 4:
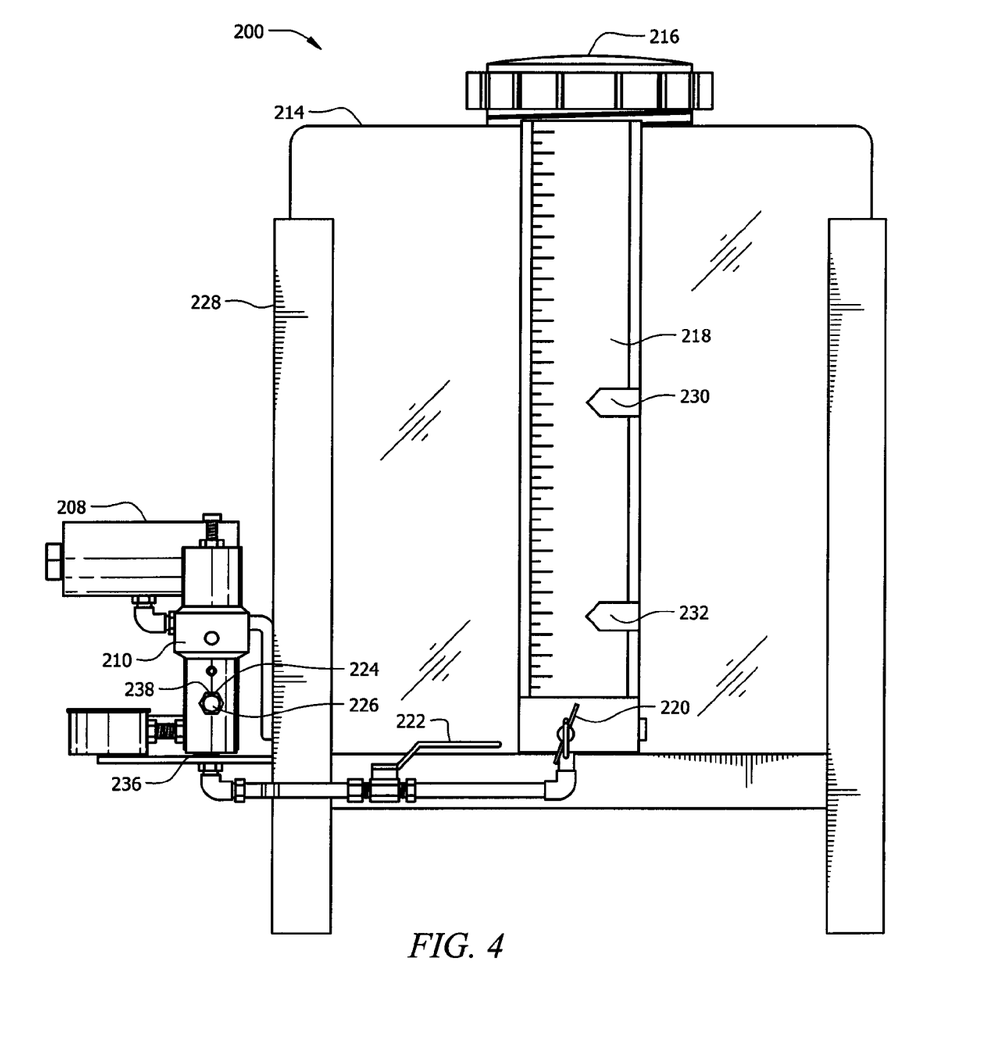
FIG. 4 is a side view of one embodiment of a pneumatic line deicing system.
Figure 5:
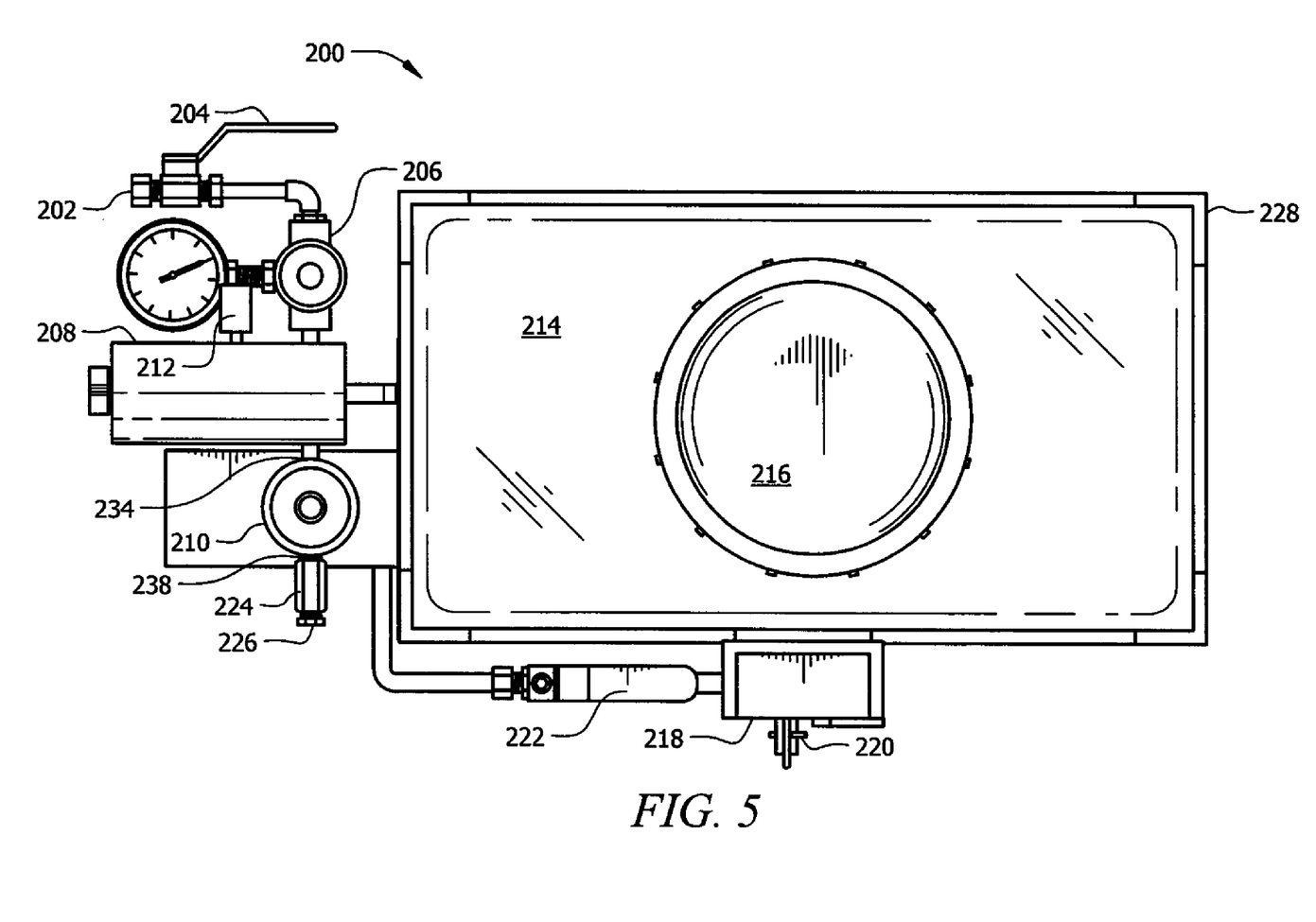
FIG. 5 is a top view of one embodiment of a pneumatic line deicing system.
Figure 6:
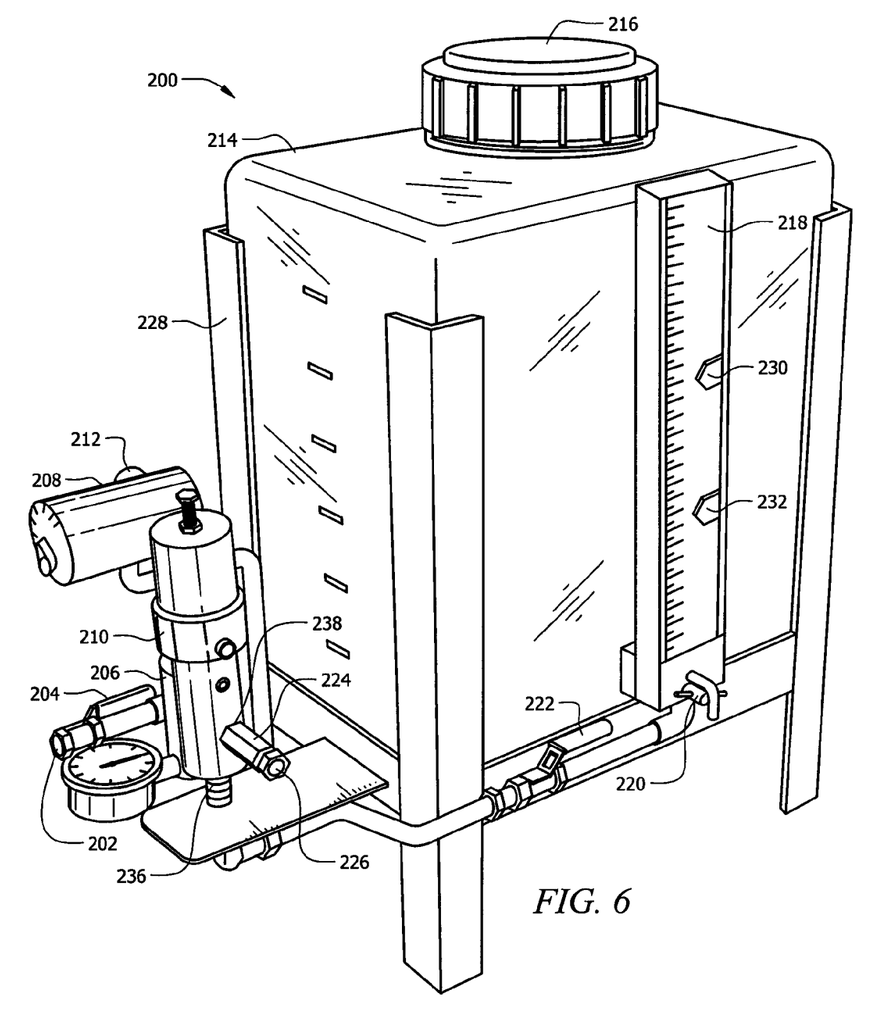
FIG. 6 is a perspective view of one embodiment of a pneumatic line deicing system.

In an embodiment, the pneumatic line deicing system 200 may be configured to inject the deicing fluid into the pneumatic line 104 based on a temperature. Specifically, the pneumatic line deicing system 200 may be set to inject the deicing fluid at a specific temperature, such as the freezing point of the moisture in the pneumatic line 104 or another predetermined temperature. For example, the pneumatic line deicing system 200 may be configured to refrain from injecting the deicing fluid into the pneumatic line 104 when the ambient temperature is above about 35° F. and configured to inject the deicing fluid into the pneumatic line 104 when the ambient temperature is at or below about 35° F. In such a case, the pneumatic line deicing system 200 may prevent the formation of frozen moisture within the pneumatic line 104. Alternatively or additionally, the amount of deicing fluid injected into the pneumatic line 104 may be temperature dependent such that the amount of deicing fluid injected into the pneumatic line 104 increases as the temperature decreases. In any event, the pneumatic line deicing system 200 may be configured with a thermometer or thermocouple to measure either the ambient temperature or the temperature within the pneumatic line 104, as well as a controller that adjusts the deicing fluid injection rate based on the temperature, e.g. a thermostat.

In another embodiment, the pneumatic line deicing system 200 may be configured to inject the deicing fluid into the pneumatic line 104 based on a pressure. Specifically, the pneumatic line deicing system 200 may be set to inject the deicing fluid upon detection of a predetermined pressure drop in the pneumatic line 104. For example, the pneumatic line deicing system 200 may be configured to refrain from injecting the deicing fluid into the pneumatic line 104 when the pressure drop between the air compressor 102 and the rig 106 is less than about 10 psi, and configured to inject the deicing fluid into the pneumatic line 104 when the pressure drop between the air compressor 102 and the rig 106 is greater than or equal to about 10 psi. In such a case, the pneumatic line deicing system 200 may not necessarily prevent the formation of frozen moisture within the pneumatic line 104, but rather mitigates or eliminates existing frozen moisture within the pneumatic line 104. Alternatively or additionally, the amount of deicing fluid injected into the pneumatic line 104 may be pressure dependent such that the amount of deicing fluid injected into the pneumatic line 104 increases as the pressure drop increases. In any event, the pneumatic line deicing system 200 may be configured with a pressure gauge coupled to a plurality of points along the pneumatic line 104 to measure the pressure within the pneumatic line 104, as well as a controller that adjusts the deicing fluid injection rate based on the pressure drop.

In yet another embodiment, the pneumatic line deicing system 200 may be configured to inject the deicing fluid into the pneumatic line 104 based on the concentration of deicing fluid in the pneumatic line 104. Specifically, the pneumatic line deicing system 200 may be set to inject the deicing fluid at a specific concentration of deicing fluid in the pneumatic line 104. For example, the pneumatic line deicing system 200 may be configured to refrain from injecting the deicing fluid into the pneumatic line 104 when the concentration of deicing fluid in the pneumatic line is above 1% and configured to inject the deicing fluid into the pneumatic line 104 when the concentration of deicing fluid in the pneumatic line 104 is at or below 1%. In such a case, the pneumatic line deicing system 200 may prevent the formation of frozen moisture within the pneumatic line 104. Alternatively or additionally, the amount of deicing fluid injected into the pneumatic line 104 may be concentration dependent such that the amount of deicing fluid injected into the pneumatic line 104 increases as the concentration of deicing fluid in the pneumatic line 104 decreases. In any event, the pneumatic line deicing system 200 may be configured with concentration gauge to measure the concentration of deicing fluid in the pneumatic line 104, as well as a controller that adjusts the deicing fluid injection rate based on the concentration of deicing fluid.

The pneumatic line deicing system 200 may be used in the oilfield services. For example, the pneumatic line deicing system 200 may be transported to a wellbore servicing site. In an embodiment, the wellbore servicing site comprises the rig 106 and the pneumatic line 104. The pneumatic line deicing system 200 may be connected to the pneumatic line 104. In an embodiment, the pneumatic line deicing system 200 is connected in parallel with the pneumatic line 104. The operations on the wellbore servicing site may be monitored so that upon a detection of a non-optimal situation, such as the formation of ice in the pneumatic line 104, the pneumatic line deicing system 200 may inject deicing fluid into the pneumatic line 104. In an embodiment, the amount of deicing fluid injected into the pneumatic line 104 and the frequency at which the deicing fluid is injected into the pneumatic line 104 by the pneumatic line deicing system 200 is selected by a user and depends on the degree of the non-optimal situation. The operations on the wellbore servicing site may continue to be monitored to ensure that the injection of the deicing fluid corrected the non-optimal situation at the wellbore servicing site. The pneumatic line deicing system 200 may continue to be used whenever a non-optimal situation is detected. However, in an embodiment, the pneumatic line deicing system 200 is used prior to the detection of a non-optimal situation to prevent the non-optimal situations from arising in the first place.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Specifically, while the process is described in terms of a continuous process, it is contemplated that the process can be implemented as a batch process. In addition, where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims that follow, that scope including all equivalents of the subject matter of the claims. Each and every claim is incorporated into the specification as an embodiment of the present invention. Thus, the claims are a further description and are an addition to the preferred embodiments of the present invention.

What is claimed is:

1. A wellbore servicing method comprising:
supplying a deicing fluid to a pressurized pneumatic line on a wellbore servicing equipment, whereby the deicing fluid retards the formation of ice within the pressurized pneumatic line.

2. The wellbore servicing method of claim 1, wherein the wellbore servicing equipment is a drilling rig, and wherein the pressurized pneumatic line powers pneumatic tools on the drilling rig.

3. The wellbore servicing method of claim 1, wherein the deicing fluid is supplied to the pressurized pneumatic line intermittently.

4. The wellbore servicing method of claim 1, wherein the deicing fluid is supplied to the pressurized pneumatic line when the temperature falls below a specified threshold.

5. The wellbore servicing method of claim 1 further comprising:
receiving air from the pressurized pneumatic line at a first pressure;
decreasing the pressure of the air to a second pressure less than the first pressure; and
using the air at the second pressure to supply the deicing fluid to the pneumatic line at a third pressure greater than the first pressure.

6. The wellbore servicing method of claim 1, wherein the deicing fluid is supplied within the pressurized pneumatic line.

7. A wellbore servicing method comprising:
transporting a pneumatic line deicing system to a wellbore servicing site;
connecting the pneumatic line deicing system to a pneumatic line;
monitoring operations on the wellbore servicing site;
detecting a non-optimal situation at the wellbore servicing site;
injecting a deicing fluid by the pneumatic line deicing system into the pneumatic line; and
monitoring the wellbore servicing site to ensure that the injection of the deicing fluid corrected the non-optimal situation at the wellbore servicing site.

8. The wellbore servicing method of claim 7, wherein the non-optimal situation at the wellbore servicing site is the formation of ice in the pressurized pneumatic line.

9. The wellbore servicing method of claim 7, wherein the pneumatic line deicing system is connected in parallel with the pressurized pneumatic line.

10. The wellbore servicing method of claim 7, wherein the deicing fluid comprises alcohol, methanol, ethylene glycol, or combinations thereof.

* * * * *